(No Model.) 2 Sheets—Sheet 1.

F. W. CORRIGAN.
COAL AUGER.

No. 483,210. Patented Sept. 27, 1892.

Witnesses:
J. B. McGirr.
M. L. Moran.

Inventor:
Francis W. Corrigan
per N. W. Fitzgerald & Co.
Attorneys.

(No Model.) 2 Sheets—Sheet 2.
F. W. CORRIGAN.
COAL AUGER.
No. 483,210. Patented Sept. 27, 1892.
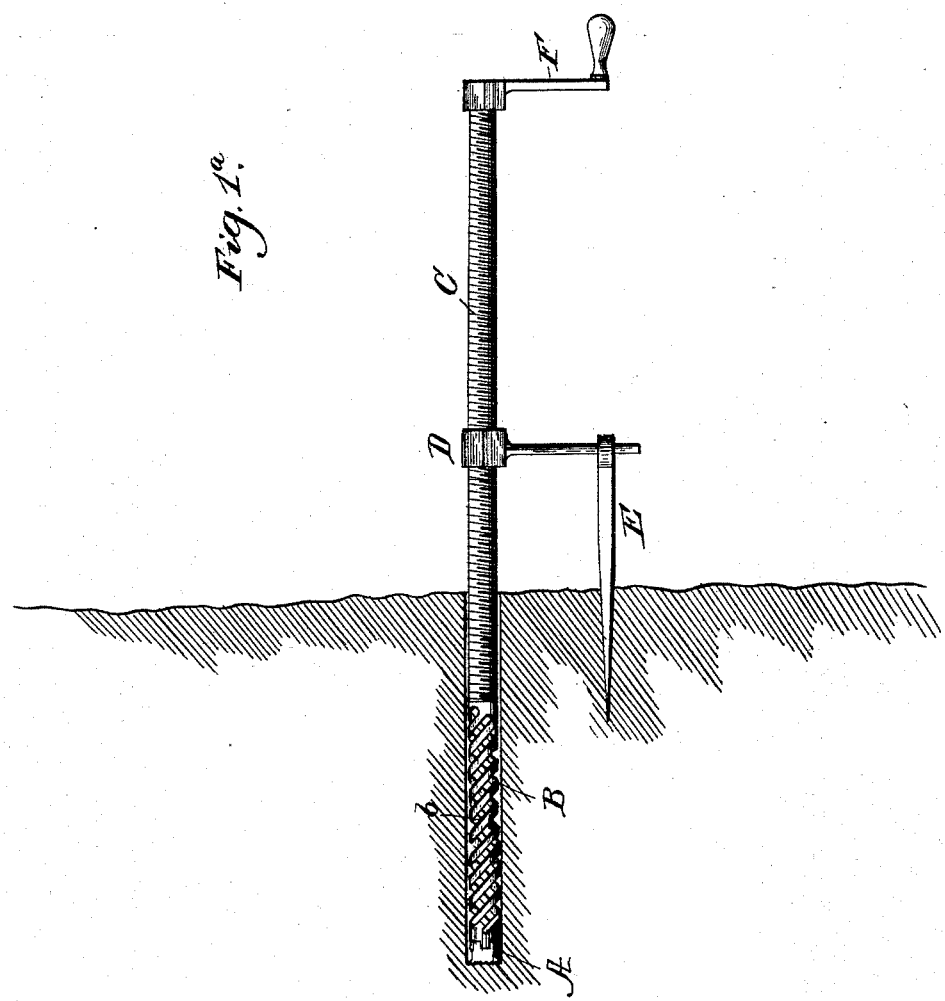
Witnesses:
J. B. McGirr.
M. L. Moran.
Inventor:
Francis W. Corrigan
per
N. W. Fitzgerald & Co.,
Attorneys.

UNITED STATES PATENT OFFICE.

FRANCIS W. CORRIGAN, OF LUZERNE, PENNSYLVANIA.

COAL-AUGER.

SPECIFICATION forming part of Letters Patent No. 483,210, dated September 27, 1892.

Application filed December 22, 1891. Serial No. 415,911. (No model.)

*To all whom it may concern:*

Be it known that I, FRANCIS W. CORRIGAN, a citizen of the United States of America, residing at Luzerne, in the county of Luzerne and State of Pennsylvania, have invented certain new and useful Improvements in Coal-Augers, of which the following is a specification, reference being had therein to the accompanying drawings.

My invention relates to an improved coal-auger, and has for its object to facilitate the boring of the coal, hard or soft, and to prevent the dust or particles of coal caused by the cutting or sawing thereof from clogging the saw, thus facilitating the cutting of the coal, and to permit the mandrel or shaft of the auger to receive the core or piece of coal as the operation of boring or cutting is effected; and to these ends the invention consists in the detailed construction and combination of parts, as hereinafter more fully disclosed, and pointed out in the claim.

Figure 1:
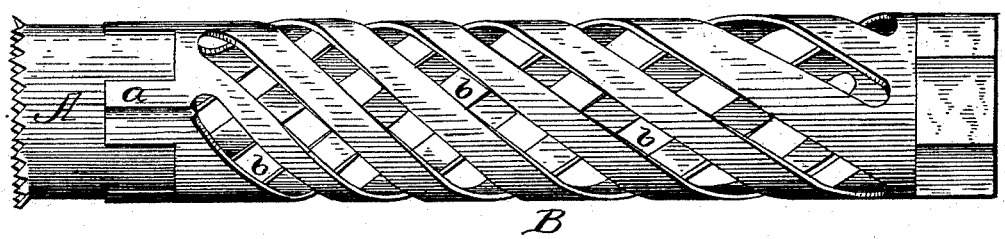
Figure 2:
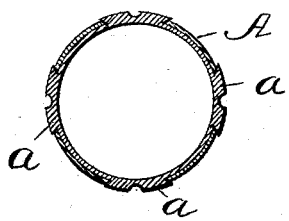
Figure 3:
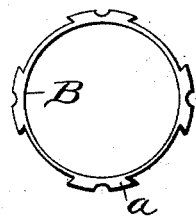
Figure 4:
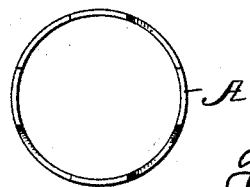

In the accompanying drawings, Figure 1 is a side view of my improved coal-auger as applied for use. Fig. 2 is a cross-section thereof taken through the mandrel or barrel, and Fig. 3 is a view showing the cutter and its mandrel or shaft separated. Fig. 4 is a rear view of the saw A. Fig. 1ª shows a body of coal in section and the device in working position.

In carrying out my invention I employ as the cutter or bit a hollow cylindric or barrel saw A and a hollow cylindric mandrel or shaft B, the former being adapted to be detachably connected to the latter it may be by means of a series of integral finger-like projections or extensions $a$, preferably beveled at their edges and snugly fitting and engaging corresponding or dovetailed grooves or sockets in the outer surface of the mandrel or shaft to render the saw or cutter readily removable for renewal when necessary. The annular form of the bit and of its series of projections not only enables the bit to be readily detached, but also permits the beveled projections on the respective parts to support one another and to be tightened at opposite points of the circle by their elasticity and the lateral thrust of the work. Thus the annular series of cutters acts as a whole to tighten its means of attachment to the mandrel.

The mandrel or shaft B, in addition to being hollow, is also provided throughout its length with preferably longitudinal serpentine or spiral openings or slots $b$ for the passage therethrough of the dust or particles of coal to the outside of the mandrel or shaft, thus preventing the clogging or choking of the saw and providing for sawing or boring the coal with facility.

The outer end of the mandrel or shaft B is angular to permit of the application thereto of the corresponding end of a feed-screw C, passing through a screw-threaded support or bearing D, having its free end held in the apertured outer end of a bar E, driven firmly into the coal.

To the outer end of the feed-screw C is applied a crank or handle F for actuation to effect the sawing or boring operation. It is also seen that the core or piece of coal produced by the saw or cutter will be received bodily into the hollow mandrel or shaft and then permitted to be readily removed with the removal of the auger without the least inconvenience whenever change of auger is necessary.

Having thus fully described my invention, what I claim as new, and desire to secure by Letters Patent, is—

A coal-auger having a hollow mandrel provided with an annular series of dovetailed grooves or recesses for the reception of a bit, in combination with a hollow bit having a serrated cutter and an annular series of rearward projections to engage the dovetailed grooves upon the mandrel, the mandrel-shaft being provided with a series of spiral openings throughout its length, substantially as described.

In testimony whereof I affix my signature in presence of two witnesses.

FRANCIS W. CORRIGAN.

Witnesses:
C. W. MILLARD,
H. B. SCHOOLEY.